United States Patent
Kassner et al.

(10) Patent No.: US 11,993,145 B2
(45) Date of Patent: May 28, 2024

(54) METHOD, DEVICE AND COMPUTER-READABLE STORAGE MEDIUM WITH INSTRUCTIONS FOR CONTROLLING A DISPLAY OF AN AUGMENTED REALITY DISPLAY DEVICE FOR A MOTOR VEHICLE

(71) Applicant: Volkswagen Aktiengesellschaft, Wolfsburg (DE)

(72) Inventors: Astrid Kassner, Berlin (DE); Matthias Henning, Berlin (DE); Norwin Schmidt, Westerland (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 931 days.

(21) Appl. No.: 16/979,127

(22) PCT Filed: Feb. 13, 2019

(86) PCT No.: PCT/EP2019/053584
§ 371 (c)(1),
(2) Date: Sep. 8, 2020

(87) PCT Pub. No.: WO2019/174841
PCT Pub. Date: Sep. 19, 2019

(65) Prior Publication Data
US 2020/0406754 A1 Dec. 31, 2020

(30) Foreign Application Priority Data
Mar. 15, 2018 (DE) ...................... 10 2018 203 927.5

(51) Int. Cl.
*B60K 35/00* (2024.01)
*B60K 35/23* (2024.01)
*B60K 35/28* (2024.01)

(52) U.S. Cl.
CPC .............. *B60K 35/00* (2013.01); *B60K 35/23* (2024.01); *B60K 35/28* (2024.01);
(Continued)

(58) Field of Classification Search
None
See application file for complete search history.

(56) References Cited

U.S. PATENT DOCUMENTS 9,809,165 B1 11/2017 Misu et al.
2015/0185039 A1 7/2015 Milicic et al.
(Continued)

FOREIGN PATENT DOCUMENTS

CN 104049927 A 9/2014
DE 10245334 A1 4/2004
(Continued)

OTHER PUBLICATIONS

PCT/EP2019/053584. Int'l Search Report (May 21, 2019).
(Continued)

*Primary Examiner* — Tamara L Weber
(74) *Attorney, Agent, or Firm* — Peter Zura; LOZA & LOZA, LLP (57) ABSTRACT

Technologies and techniques for controlling a display of an augmented reality display device for a motor vehicle. A maneuver scheduler determines a target maneuver of the motor vehicle. An execution location of the target maneuver is determined. A graphics generator generates a target maneuver marking for a display by the augmented reality display device on the basis of the information. The target maneuver marking is outputted for display by the augmented reality display device. The target maneuver marking is displayed in such a way that the target maneuver marking is displayed in a stationary manner in the region of the execu-
(Continued)

tion location of the target maneuver perpendicularly on a lane to be travelled by the motor vehicle.

18 Claims, 5 Drawing Sheets

(52) U.S. Cl.
CPC .. *B60K 2360/165* (2024.01); *B60K 2360/166* (2024.01); *B60K 2360/177* (2024.01); *B60K 2360/347* (2024.01)

(56) References Cited

U.S. PATENT DOCUMENTS

| | | | |
|---|---|---|---|
| 2015/0211877 A1 | 7/2015 | Laycock et al. | |
| 2015/0331238 A1* | 11/2015 | Roth | G06F 3/017 348/115 |
| 2016/0003636 A1* | 1/2016 | Ng-Thow-Hing | G01C 21/365 701/418 |

FOREIGN PATENT DOCUMENTS

| | | |
|---|---|---|
| DE | 102012216144 A1 | 5/2014 |
| DE | 102013224307 A1 | 5/2015 |
| DE | 102014219575 A1 | 7/2015 |
| DE | 102016203080 A1 | 8/2017 |
| EP | 2412557 A1 | 2/2012 |
| EP | 2505962 A | 10/2012 |
| EP | 3248824 A1 | 11/2017 |
| JP | 201820779 A | 2/2018 |
| WO | 2002010838 A1 | 2/2002 |
| WO | 2005121707 A2 | 12/2005 |
| WO | 2010109941 A1 | 9/2010 |
| WO | 2013113348 A1 | 8/2013 |
| WO | 2013114617 A1 | 8/2013 |
| WO | 2013188593 A1 | 12/2013 |
| WO | 2017195026 A2 | 11/2017 |

OTHER PUBLICATIONS

DE102018203927.5. Office Action (Nov. 30, 2018).
Corresponding Chinese App. Serial No. 2019800195513. 1st Office Action (Mar. 31, 2023).

* cited by examiner

METHOD, DEVICE AND COMPUTER-READABLE STORAGE MEDIUM WITH INSTRUCTIONS FOR CONTROLLING A DISPLAY OF AN AUGMENTED REALITY DISPLAY DEVICE FOR A MOTOR VEHICLE

RELATED APPLICATIONS

The present application claims priority to international patent app. no. PCT/EP2019/053584 to Astrid Kassner, et al., filed Feb. 13, 2019, which claims priority to German patent app. no. DE 10 2018 203 927.5, filed Mar. 15, 2018, the contents of each being incorporated by reference in their entirety herein.

BACKGROUND

The present disclosure relates to a method, a device, and a computer-readable storage medium with instructions for controlling a display from an augmented reality display device for a motor vehicle. The present disclosure also relates to a motor vehicle, in which is the present technologies and techniques are used.

Vehicle navigation will increasingly use a head-up display (HUD) in the future. Light beams from a display built into a dashboard are deflected via numerous mirrors and lenses, and reflected via a projection surface to the eyes of the driver such that the driver sees a virtual image outside the vehicle. The windshield is frequently used as the projection surface in the automotive industry, the curved shape of which must be taken into account in the presentation. Alternatively, an additional pane made of glass or plastic may also be used, which is located between the driver and the windshield on the dashboard. In such a configuration, less head and eye movement is necessary for reading the information as a result of the of the optical overlaying of the display onto the driver's field of vision. In addition, the eyes do not have to adapt as much, because nothing or very little refocusing is required, depending on the virtual distance to the display. Current serial HUDs are limited, however, to displays directly beneath the driver's primary field of vision. This display technology reduces the time a driver must look away from the street, but has the disadvantage that the information presented therewith must be interpreted and applied to the actual situation, because it is not seen within the real scenario. This can represent a mentally challenging cognitive process in complex situations.

In this respect, WO 2002/010838 A1 describes a navigation process in a motor vehicle in which a directional symbol is projected onto a windshield as a display by a navigation device based on a selected route. The presentation of the directional symbol takes place on the basis of signals from perspective recognition system. When approaching an intersection, the directional symbol moves toward the intersection on the windshield. In addition, the size or color of the directional symbol can change.

DE 10 2016 203 080 A1 describes a method for operating a head-up display for a motor vehicle, in which instructions based on current driving data are projected into the driver's field of vision by the head-up display. A current position and direction or route of the motor vehicle is obtained using a satellite-based navigation system. Furthermore, a point is determined at which a maneuver is to be undertaken in the pathway of the motor vehicle. Based on the distance from the motor vehicle to the maneuver point, one or more maneuver arrows are projected. The maneuver arrows are shown as virtual guardrails.

As virtual and augmented reality technologies and applications continue to be developed, they are also being used in automobiles, in particular with head-up displays. Augmented reality (AR) comprises an enhancement of the real world with virtual elements that are observed in three-dimensional space at the correct location, enabling real-time interaction. Because in the German-speaking professional world the term "augmented reality" has replaced the German term for "enhanced reality," the first of these terms shall be used herein. The expression "mixed reality" is also used synonymously. Augmented reality glasses can also be used for AR displays. Augmented reality glasses are worn like normal glasses, but they have one or more projection units or displays with which information can be projected in front of the eyes of the glasses wearer or directly onto the wearer's retina. The glasses are designed such that the wearer can also see the environment.

By marking objects and inserting information at their actual locations, e.g., with a contact analogue presentation, information relating to the environment can be presented in the driver's field of vision. This direct graphic enhancement of the environment in the form of augmented reality can substantially reduce the cognitive demands on the driver. Augmented reality offers numerous possibilities for aiding the driver through a contact analogue marking of roadways and objects, in particular for vehicle navigation. While classic navigation displays in a conventional head-up display normally show schematic illustrations, e.g. a right-angled arrow pointing toward the right indicates that a right turn should be made at the next opportunity, AR displays offer substantially more effective possibilities.

Numerous augmented navigation presentations contain navigation markings that extend into the street where the turn is to be made, e.g. a carpet or an arrow lying on the surface of the street. These navigation markings may be difficult for the driver to see, however, because at greater distances the markings may only be formed by a few pixels in the display. Furthermore, this form of presentation cannot be implemented in head-up displays with the display sizes currently under discussion, because the intersecting street normally lies outside the display region.

Technologies and techniques are needed for controlling an augmented reality display device for a motor vehicle that generates readily observable markings for the driver.

BRIEF SUMMARY

Various technologies and techniques are disclosed for controlling a display by an augmented reality display device for a motor vehicle. Exemplary steps for implementing control include, but are not limited to: determining a target maneuver for the motor vehicle; determining where the target maneuver is to take place; generating a target maneuver marking for display by the augmented reality display device; and outputting the target maneuver marking to be displayed by the augmented reality display device such that the target maneuver marking is located vertically where the target maneuver is to be carried out, indicating the direction that the vehicle is to take.

In some examples, a computer-readable storage medium is disclosed that includes instructions in the form of the following steps, that are executed on a computer, by means of which an augmented reality display is controlled in a motor vehicle: determining a target maneuver for the motor vehicle; determining where the target maneuver is to take place; generating a target maneuver marking that is to be displayed by the augmented reality display device; and outputting the target maneuver marking for display by the augmented reality display device such that the target maneuver marking is located vertically where the target maneuver is to be carried out, indicating the direction that the vehicle is to take.

The term "computer" is to be understood in a broad manner. It may also include control units and other processor-based data processing devices.

In other examples, a device is disclosed for controlling a display by an augmented reality display device for a motor vehicle, where the device includes: a maneuver planner for determining a target maneuver for the motor vehicle and for determining a location where the maneuver is to be carried out; a graphics generator for generating a target maneuver marking for display by the augmented reality display device; and an output for outputting the target maneuver marking for display by the augmented reality display device such that the target maneuver marking is located vertically where the target maneuver is to be carried out, indicating the direction the vehicle is to take.

To aid the user with continuous street and route guidance, a target maneuver marking may be projected at the location of the next maneuver, e.g. an intersection, above the street. The target maneuver marking may be placed vertically on the roadway, like a traffic sign or some other physical object, i.e., not floating above the road. This enables the driver to reliably locate the display. Because the target maneuver marking may be located on the roadway that the motor vehicle is traveling on, this target maneuver marking can already be seen from a distance. The term "roadway" refers to part of the street on which the vehicle is driven, i.e. when turning, the roadway follows the trajectory of the vehicle. With this solution, there is no need for the marking to accompany the entire turning process. Because what needs to be done in order to execute the maneuver is normally clear to the driver from the point when the maneuver is initiated, the necessity of such an accompanying marking is optional.

According to one aspect of the present disclosure, the target maneuver marking may be presented such that it may be superimposed on objects or other road users in the display area. In this manner, it can be ensured that the user is still informed of the upcoming target maneuver, even if the location for the target maneuver is concealed by another vehicle, for example.

According to another aspect, the target maneuver marking may be presented such that it is located on the side of the roadway on which the motor vehicle is traveling, transverse thereto. The target maneuver takes place at this location, e.g. a turning procedure, directly in front of the display of the target maneuver marking. The user therefore reliably realizes where the target maneuver is to be carried out. If the target maneuver marking were placed in the middle of the road, the vehicle would have to pass through the marking, which could be confusing for the user.

According another aspect, the target maneuver marking may be presented such that it appears to grow larger as the motor vehicle approaches the location where the target maneuver is to be carried out. As a result, the user is always approaching a visual anchor, after which a new driving maneuver becomes necessary.

According to another aspect, the target maneuver marking may be supplemented by at least one piece of additional navigation information. Further useful information is provided to the user with the additional navigation information, e.g. the distance to where the target maneuver is to be carried out, that aids the user in carrying out driving maneuvers.

According to another aspect, the target maneuver marking may be changed to an enhanced presentation when the motor vehicle approaches the location where the target maneuver is to be carried out, when it is within a limit distance thereto. The target maneuver marking can be augmented with additional elements in the enhanced presentation, which clarify the maneuver. The change in presentation first takes place within a limit distance at which the target maneuver marking has already obtained a certain minimal size. In this manner, it is ensured that the enhanced presentation can be displayed with a sufficient resolution.

According to another aspect, the target maneuver marking for clarifying the upcoming target maneuver may be animated. An animation, e.g. an illumination of the pathway of the target maneuver, enables an additional clarification of the upcoming maneuver, e.g. the direction of travel to be selected.

According to another aspect, the augmented reality display device may be an augmented reality head-up display device, or data glasses. Both a head-up device and data glasses are ideally suited for providing a user with augmented reality information. Furthermore, as these technologies become more common, it can be assumed that it will become possible to implement the solution according to the invention more easily.

These and other aspects may be particularly advantageously implemented in a vehicle, in particular a motor vehicle.

BRIEF DESCRIPTION OF THE DRAWINGS

Further features of the present invention shall become apparent from the following description and the attached claims in conjunction with the drawings. Therein:

DETAILED DESCRIPTION

Various aspects of the present disclosure are explained below in greater detail in reference to the figures. It should be understood that the invention is not limited to these embodiments, and that the features described with regard thereto can also be combined or modified, without abandoning the scope of protection for the invention, as it is defined in the attached claims.

Figure 1:
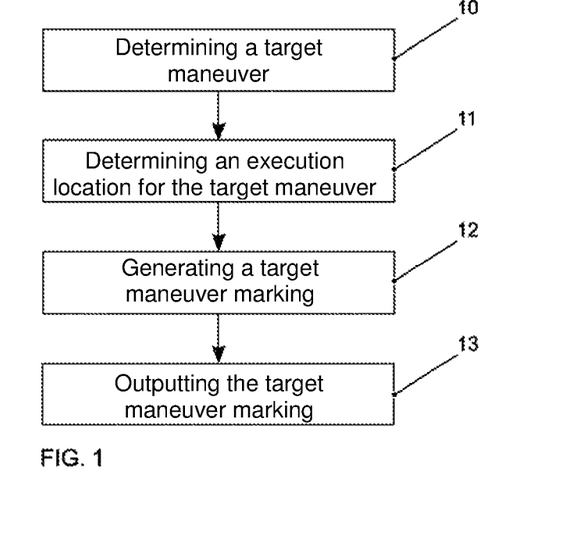
FIG. 1 shows, schematically, a method for controlling a display by an augmented reality display device for a motor vehicle.

FIG. 1 schematically illustrates a process for controlling a display by an augmented reality display device in a motor vehicle. In a first step 10, a maneuver planner determines a target maneuver for the motor vehicle. A location for the target maneuver is then determined in step 11. A graphics generator generates a target maneuver marking for display by the augmented reality display device based on this information in step 12. The target maneuver marking is then output for display on the augmented reality display device in step 13. The target maneuver marking is displayed such that the target maneuver marking is located vertically where the target maneuver is to take place, indicating the direction the vehicle is to take. This target maneuver marking may be located on the side of the road, transverse thereto. To indicate that the motor vehicle is approaching the location for the upcoming target maneuver, the target maneuver marking may be configured to become larger as the vehicle approaches this position. It is also possible to change to an enhanced presentation of the target maneuver marking when the vehicle reaches a limit distance to the location. The target maneuver marking may be superimposed on existing objects or other road users in the projection region. If desired, the target maneuver marking can also be supplemented with further navigation information, or it can be animated. Instead of outputting the generated target maneuver marking to a control unit for the augmented reality display device, a command can be transmitted to the control unit, indicating that a corresponding target maneuver marking needs to be generated. It is likewise possible for the method to be entirely carried out by the control unit for the augmented reality display device.

Figure 2:
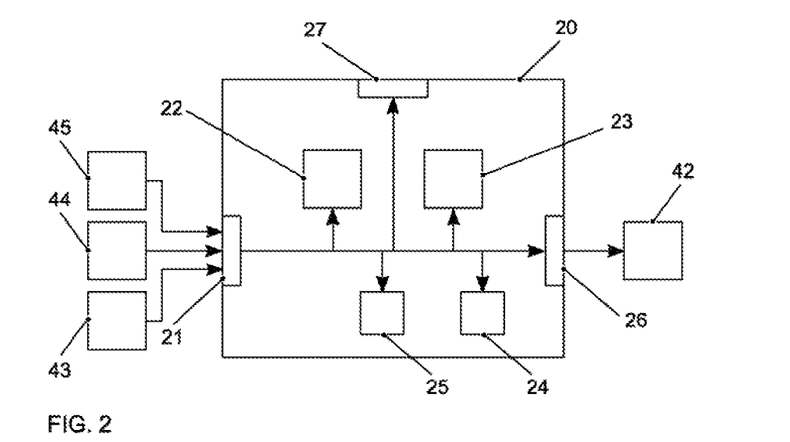
FIG. 2 shows a first embodiment of a device for controlling a display by an augmented reality display device for a motor vehicle.

FIG. 2 shows a simplified schematic illustration of a a device 20 for controlling a display by an augmented reality display device for a motor vehicle. The device 20 includes an input 21, via which image data from a camera 43, data from a sensor system 44, or data from a navigation system 45, for example, can be received. The sensor system 44 can detect an environment of the motor vehicle, for example. The device 20 also contains a maneuver planner 22 for determining a target maneuver for the motor vehicle and for determining a location for carrying out the target maneuver. A graphics generator 23 may generate a target maneuver marking, among other things, based on this information from the maneuver planner 22, which is then displayed by the augmented reality display device. The augmented reality display device can be a head-up display or data glasses, by way of example.

The target maneuver marking is output to a control unit 42 for the augmented reality display device via an output 26 in the device. Alternatively, it is also possible to transmit a command to a control unit 42 to generate a corresponding target maneuver marking. The control unit 42 can then insert the target maneuver marking into a display on the augmented reality display device. The target maneuver marking is displayed such that the target maneuver marking is located at the position for the upcoming target maneuver, indicating the direction the vehicle is to take. The target maneuver marking may be located on the side of the road, transverse thereto. In order to indicate that the motor vehicle is approaching the location for the upcoming target maneuver, the target maneuver marking may be configured to become larger. The target maneuver marking can also change to an enhanced presentation within a limit distance to the target maneuver location. This target maneuver marking may be superimposed on existing objects or other road users within the projection region. Furthermore, the target maneuver marking can be supplemented with additional navigation information, or it can be animated.

The maneuver planner 22 and the graphics generator 23 can be controlled by a control unit 24. Settings for the maneuver planner 22, the graphics generator 23, or the control unit 24 can be changed via the user interface 27 as needed. The data sent to the device 20 can also be stored in a memory 25 in the device 20 if desired, e.g. for later evaluation or use by the components of the device 20. The maneuver planner 22, the graphics generator 23, and the control unit 24 can form dedicated hardware, e.g. in the form of an integrated circuit. As a matter of course, they can also be partially or fully combined or implemented as software that runs on an appropriate processor, e.g. a GPU or a CPU. The input 21 and the output 26 can be separate interfaces or they can be combined to form a bidirectional interface. In this example, the device 20 is a stand-alone component. It can also be integrated in the control unit 42 for the augmented reality display device.

Figure 3:
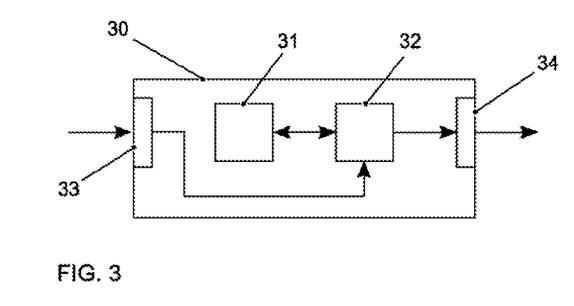
FIG. 3 shows a second embodiment of a device for controlling a display by an augmented reality display device for a motor vehicle.

FIG. 3 shows a simplified schematic illustration of another embodiment of a device 30 for controlling a display on an augmented reality display device for a motor vehicle according to some aspects. The device 30 has a processor 32 and a memory 31. By way of example, the device 30 may be configured as a computer or a control unit. Instructions are stored in the memory 31 that result in the device carrying out the steps disclosed herein when these instructions are carried out by the processor 32. The instructions stored in the memory 31 therefore embody a program that can be executed by the processor 32, which implements the method according to the invention. The device 30 has an input 33 for receiving information, e.g. navigation data or data regarding the environment of the motor vehicle. Data generated by the processor 32 are made available via an output 34. They can also be stored in the memory 31. The input 33 and output 34 can be combined to form a bidirectional interface.

The processor 32 may include one or more processor units, e.g. microprocessors, digital signal processors, or combinations thereof.

The memories 25, 31 in these embodiments may be configured with volatile and non-volatile memory areas, and include different memory devices and storage mediums, e.g. hard disks, optical storage mediums, or solid state memories.

Figure 4:
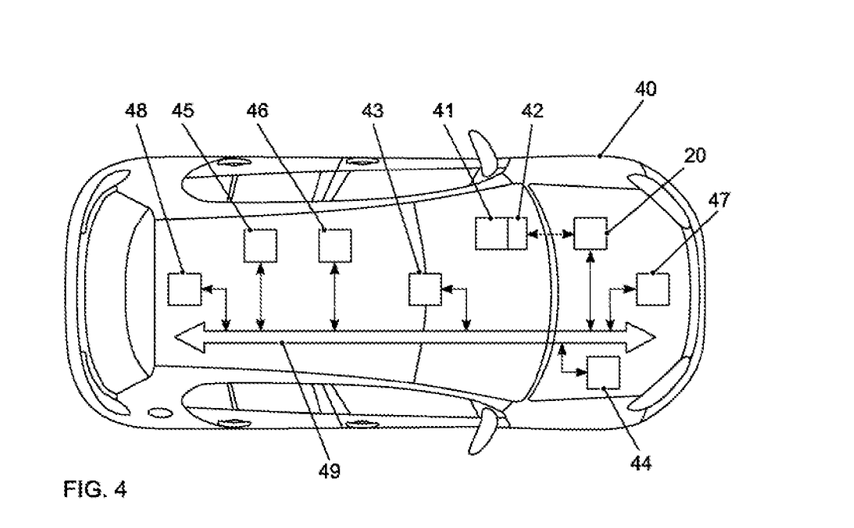
FIG. 4 shows, schematically, a motor vehicle in which a solution according to the invention is implemented.

FIG. 4 shows a schematic illustration of a motor vehicle 40 according to some aspects. The motor vehicle 40 may include an augmented reality display device 41 with a dedicated control unit 42. The motor vehicle 40 may also include a device 20 for controlling a display by the augmented reality display device 41. The device 20 can also be integrated in the augmented reality display device 41 or the control unit 42 for the augmented reality display device 41. Further components of the motor vehicle 40 include a camera 43 and a sensor system 44 for detecting the environment, a navigation system 45, a data transfer unit 46, and a series of assistance systems 47, only one of which is illustrated, by way of example. A connection to service providers can be established by means of the data transfer unit 46, e.g. for retrieving map data. There is a memory 48 for storing data. The data exchange between various components in the motor vehicle 40 takes place via a network 49.

Figure 5:
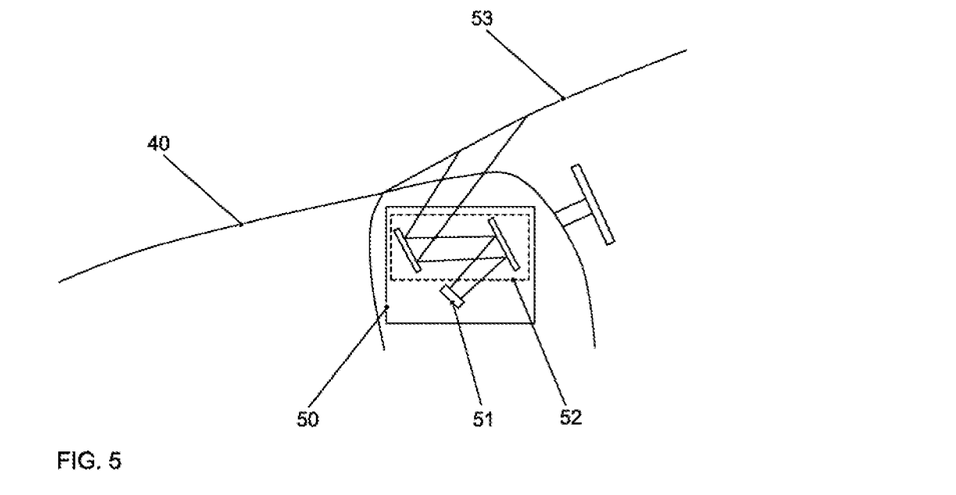
FIG. 5 shows, schematically, a general construction of a head-up display device for a motor vehicle.

FIG. 5 shows a schematic illustration of a head-up display 50 as an example of an augmented reality display device for a motor vehicle according to some aspects. Contents can be projected onto a projection surface 53 for the motor vehicle

40 using the head-up display 50, e.g. on the windshield or on an additional pane of glass or plastic located between the driver and the windshield on the dashboard. These contents are generated by an imaging unit 51 and projected onto the projection surface 53 using an optical module 52. The projection typically takes place in a region on the windshield above the steering wheel. The imaging unit 51 can be an LCD-TFT display, for example. The head-up display 50 is normally incorporated in the dashboard of the motor vehicle 40.

Figure 6:
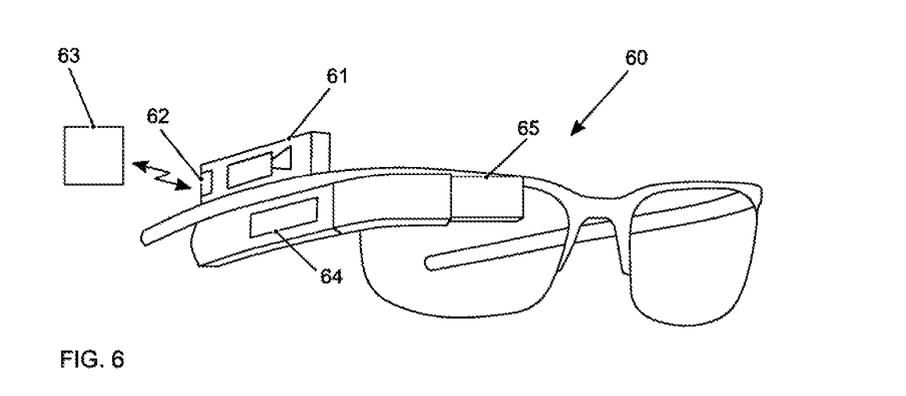
FIG. 6 shows, schematically, a pair of augmented reality glasses.

FIG. 6 shows a schematic illustration of a pair of augmented reality glasses 60 as an example of an augmented reality display device according to some aspects. The augmented reality glasses 60 may include a camera 61 for recording environment data in the environment of the augmented reality glasses 60. A connection to an external position determination device 63 for determining a position of the augmented reality glasses 60 based on environment data is obtained by means of an interface 62. The position determination device 63 can detect and evaluate, e.g., edges or contrast points in the image data for such functions.

The position determination device 63 can of course also be a component of the augmented reality glasses 60. The display by the augmented reality glasses 60 can be adapted to the determined position accordingly by means of a graphics unit 64. The position determination device 63 and the graphics unit 64 can exchange data for this. The graphics unit 64 can be a component of the augmented reality glasses 60, as shown in the example, or it can be connected to the augmented reality glasses 60 via a the interface 62. The display generated by the graphics unit 63 is superimposed by a projection unit 65. A monocular display is used in the example in FIG. 6, e.g., where the display is located in front of just one eye of the user. The solution described here can of course also be implemented with a augmented reality glasses 60 that have a binocular display, in which each eye has a separate display, or with a binocular display in which the same display is used for each eye.

Figure 7:
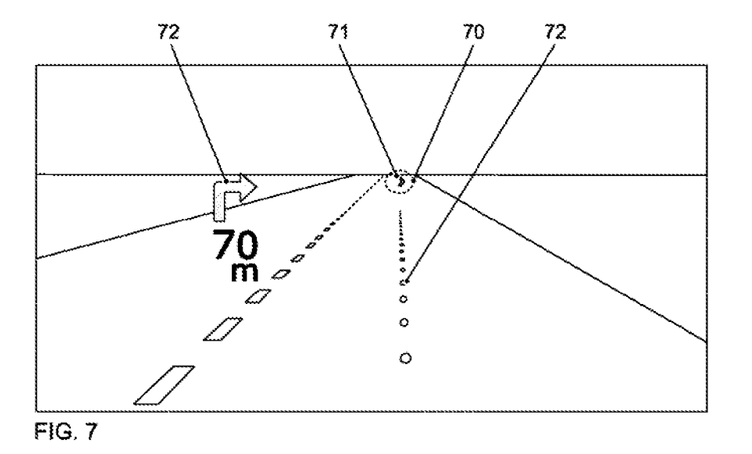
FIG. 7 shows a target maneuver marking at a distance.

FIG. 7 shows an exemplary illustration of a target maneuver marking 71 at a distance to the vehicle according to some aspects. The target maneuver is a right turn, and the execution location 70, which is indicated in the figure by a broken line in the form of an ellipse, is 70 meters in front of the vehicle. The target maneuver marking 71 may be configured as a stylized arrow pointing to the right, which corresponds to the target maneuver, which appears upright on the street at the execution location 70. Because of the distance, the target maneuver marking 71 is still quite small, but can nevertheless be readily recognized by the driver. The street onto which the vehicle is turning cannot yet be seen at this distance. In this example, the target maneuver marking 71 is supplemented with additional navigation information 72, specifically a arrow indicating a turn with distance information, and a pathway indicating the route. The pathway can be indicated by dots that either lie on the road or float above it.

Figure 8:
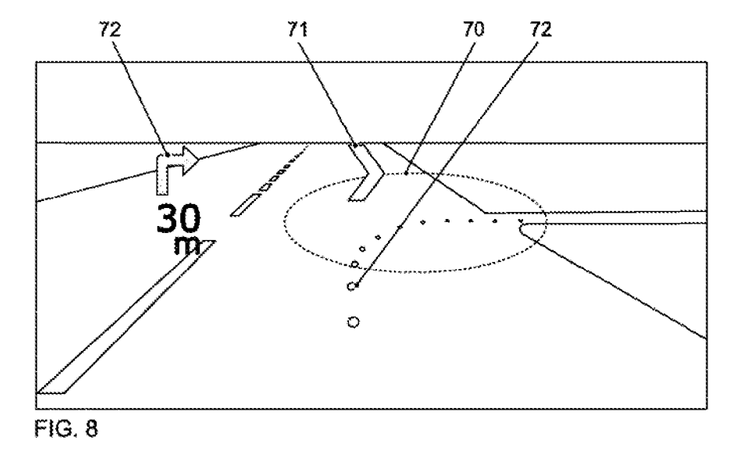
FIG. 8 shows the target maneuver marking from FIG. 7 when approaching the location for the upcoming target maneuver.

FIG. 8 shows the target maneuver marking from FIG. 7 when approaching the execution location 70 according to some aspects. The distance to the execution location 70 is now only 30 meters, and the street onto which the vehicle is turning and the pathway leading into the street can now be seen by the driver. The target maneuver marking 70 is much more visible, however, which has become much larger to indicated the shorter distance. It can be readily seen in the figure that the target maneuver marking 71 is located at the side of the road that the vehicle is turning onto, such that the driver must turn immediately in front of the target maneuver marking 71.

Figure 9:
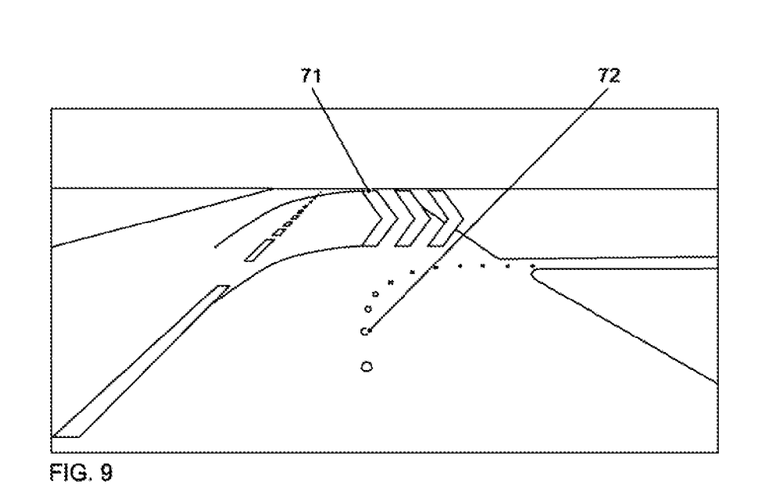
FIG. 9 shows the target maneuver marking after it has changed to an enhanced presentation.

FIG. 9 shows the target maneuver marking 71 after changing to an enhanced presentation according to some aspects. In the enhanced presentation, the original target maneuver marking 71 is supplemented with further elements. In this example, the stylized arrow indicating a turn is enhanced with additional arrows and a trail. This supplemental emphasis of the target maneuver can appear shortly before the upcoming maneuver, e.g. at a distance of 10-20 meters before reaching the execution location. The limit distance at which the change in presentation takes place can preferably be set by the user.

Figure 10:
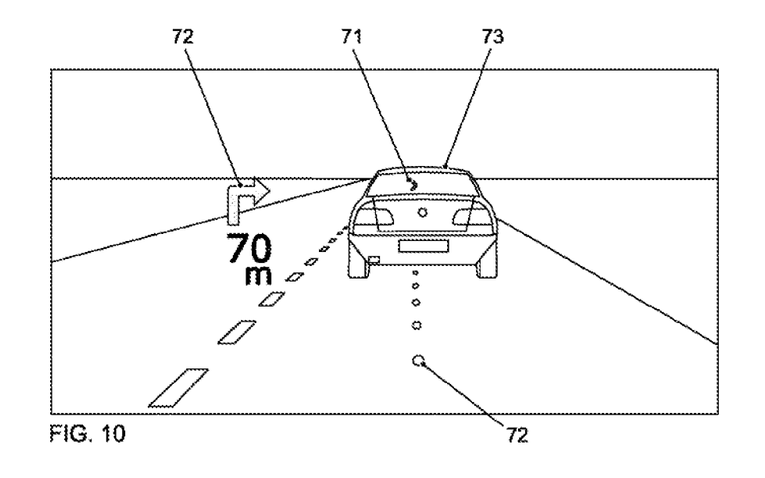
FIG. 10 shows the target maneuver marking from FIG. 7 when the location for the target maneuver is concealed by some object.

FIG. 10 shows the target maneuver marking 71 from FIG. 7 when it is concealed by an object according to some aspects. There is another road user 73 in front of the vehicle, in this case another vehicle, which conceals the execution location of the target maneuver from the driver. Accordingly, only that part of the pathway that is not concealed by the preceding vehicle is shown. The target maneuver marking 71 is superimposed on the vehicle, however, such that the driver is informed of the upcoming target maneuver despite the concealment of the execution location.

LIST OF REFERENCE SYMBOLS 10 determining a target maneuver
11 determining an execution location for the target maneuver
12 generating a target maneuver marking
13 outputting the target maneuver marking
20 device
21 input
22 maneuver planner
23 graphics generator
24 control unit
25 memory
26 output
27 user interface
30 unit
31 memory
32 processor
33 input
34 output
40 motor vehicle
41 augmented reality display device
42 control unit for the augmented reality display device
43 camera
44 sensor system
45 navigation system
46 data transfer unit
47 assistance system
48 memory
49 network
50 head-up display
51 imaging unit
52 optical module
53 projection surface
60 augmented reality glasses
61 camera
62 interface
63 position determination device
64 graphics unit
65 projection unit
70 execution location
71 target maneuver marking
72 supplementary navigation information
73 road user

The invention claimed is:

1. A method for controlling a display on an augmented reality display device for a motor vehicle, comprising:
   determining, via a maneuver planner of a computer device, a target maneuver for the motor vehicle;
   determining, via the maneuver planner of the computer device, an execution location for the target maneuver;
   generating, via a graphics generator, a target maneuver marking for display by the augmented reality display device; and
   outputting the target maneuver marking to a control unit of the augmented reality display device such that the target maneuver marking is displayed on the augmented reality display device in a stationary manner in a region of the execution location of the target maneuver perpendicular to a traffic lane to be traveled by the motor vehicle, and located in the transverse direction at an edge of the traffic lane to be traveled.

2. The method according to claim 1, wherein the target maneuver marking is generated to be superimposed in a presentation region over existing objects or other road users.

3. The method according to claim 1, wherein the target maneuver marking is generated to grow larger on the augmented reality display device as the motor vehicle approaches a location where the target maneuver is to be carried out.

4. The method according to claim 1, wherein generating the target maneuver marking comprises generating additional navigation information.

5. The method according to claim 1, wherein generating the target maneuver marking comprises changing the target maneuver marking to an enhanced presentation when the motor vehicle approaches a location where the target maneuver is to be carried out once a limit distance has been reached.

6. The method according to claim 1, wherein generating the target maneuver marking comprises animating the target maneuver marking to clarify the target maneuver that is to be carried out.

7. The method according to claim 1, wherein the augmented reality display device comprises one of an augmented reality head-up display or data glasses.

8. An apparatus for controlling a display on an augmented reality display device for a motor vehicle, comprising:
   a maneuver planner for determining a target maneuver for the motor vehicle and determining an execution location for the target maneuver;
   a graphics generator, operatively coupled to the maneuver planner, for generating a target maneuver marking for display by the augmented reality display device; and
   an output outputting the target maneuver marking for display by the augmented reality display device such that the target maneuver marking is displayed on the augmented reality display device in a stationary manner in a region of the execution location of the target maneuver perpendicular to a traffic lane to be traveled by the motor vehicle, and located in the transverse direction at an edge of the traffic lane to be traveled.

9. The apparatus according to claim 8, wherein the target maneuver marking is generated by the graphics generator to be superimposed in a presentation region over existing objects or other road users.

10. The apparatus according to claim 8, wherein the target maneuver marking is generated by the graphics generator to grow larger on the augmented reality display device as the motor vehicle approaches a location where the target maneuver is to be carried out.

11. The apparatus according to claim 8, wherein the graphics generator is configured to generate the target maneuver marking by generating additional navigation information.

12. The apparatus according to claim 8, wherein the graphics generator is configured to generate the target maneuver marking by changing the target maneuver marking to an enhanced presentation when the motor vehicle approaches a location where the target maneuver is to be carried out once a limit distance has been reached.

13. The apparatus according to claim 8, wherein generating the target maneuver marking by the graphics generator comprises animating the target maneuver marking to clarify the target maneuver that is to be carried out.

14. The apparatus according to claim 8, wherein the augmented reality display device comprises one of an augmented reality head-up display or data glasses.

15. A method for controlling a display on an augmented reality display device for a motor vehicle, comprising:
   determining, via a maneuver planner of a computer device, a target maneuver for the motor vehicle when the motor vehicle approaches a location once a limit distance has been reached;
   determining, via the maneuver planner of the computer device, an execution location for the target maneuver based on the location;
   generating, via a graphics generator, a target maneuver marking for display by the augmented reality display device, wherein the target maneuver marking is generated to be superimposed in a presentation region over existing objects or other road users; and
   outputting the target maneuver marking to a control unit of the augmented reality display device such that the target maneuver marking is displayed on the augmented reality display device in a stationary manner in a region of the execution location of the target maneuver perpendicular to a traffic lane to be traveled by the motor vehicle, and located in the transverse direction at an edge of the traffic lane to be traveled.

16. The method according to claim 15, wherein the target maneuver marking is generated to be superimposed in a presentation region over existing objects or other road users.

17. The method according to claim 15, wherein the target maneuver marking is generated on a side of a road the vehicle is on, transverse thereto.

18. The method according to claim 15, wherein generating the target maneuver marking comprises generating additional navigation information.

* * * * *